(12) United States Patent
Azar et al.

(10) Patent No.: US 7,821,517 B2
(45) Date of Patent: *Oct. 26, 2010

(54) VIDEO PROCESSING WITH MULTIPLE GRAPHICAL PROCESSING UNITS

(75) Inventors: Hassane S. Azar, San Francisco, CA (US); Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/430,797

(22) Filed: Apr. 27, 2009

(65) Prior Publication Data

US 2009/0207178 A1    Aug. 20, 2009

Related U.S. Application Data

(63) Continuation of application No. 11/267,611, filed on Nov. 4, 2005, now Pat. No. 7,525,548.

(51) Int. Cl.
*G06F 15/16* (2006.01)
*G06F 15/80* (2006.01)
*G06F 15/76* (2006.01)
*G06T 1/20* (2006.01)

(52) U.S. Cl. ............. 345/504; 345/502; 345/503; 345/505; 345/506; 712/31; 712/32

(58) Field of Classification Search ............. None
See application file for complete search history.

(56) References Cited

U.S. PATENT DOCUMENTS 5,860,086 A    1/1999    Crump et al.

(Continued)

FOREIGN PATENT DOCUMENTS

EP    0 584 982    3/1994

(Continued)

OTHER PUBLICATIONS

David V. James. "Scalable I/O Architecture for Buses", Apple Computer. Feb. 27-Mar. 3, 1989. IEEE Comp. Soc. Press, US, vol. CONF. 34, Feb. 27, 1989. pp. 539-544.

(Continued)

*Primary Examiner*—Xiao M Wu
*Assistant Examiner*—Tize Ma
(74) *Attorney, Agent, or Firm*—Patterson & Sheridan, LLP (57) ABSTRACT

One embodiment of a video processor includes a first media processing device coupled to a first memory and a second media processing device coupled to a second memory. The second media processing device is coupled to the first media processing device via a scalable bus. A software driver configures the media processing devices to provide video processing functionality. The scalable bus carries video data processed by the second media processing device to the first media processing device where the data is combined with video data processed by the first media processing device to produce a processed video frame. The first media processing device transmits the combined video data to a display device. Each media processing device is configured to process separate portions of the video data, thereby enabling the video processor to process video data more quickly than a single-GPU video processor.

17 Claims, 6 Drawing Sheets

U.S. PATENT DOCUMENTS

| | | |
|---|---|---|
| 6,359,624 B1 | 3/2002 | Kunimatsu |
| 6,473,087 B1 | 10/2002 | Tsang |
| 6,624,816 B1 | 9/2003 | Jones, Jr. |
| 6,789,154 B1 | 9/2004 | Lee et al. |
| 7,289,125 B2 | 10/2007 | Diard et al. |
| 7,337,205 B2 | 2/2008 | Sazegari |
| 7,525,548 B2 | 4/2009 | Azar et al. |
| 7,533,382 B2 | 5/2009 | Karim |
| 7,587,437 B2 | 9/2009 | Orii |
| 7,617,494 B2 | 11/2009 | Rovati et al. |
| 7,624,107 B1 | 11/2009 | Le Grand |
| 2002/0101930 A1 | 8/2002 | Wang et al. |
| 2002/0118201 A1 | 8/2002 | Mukherjee et al. |
| 2005/0190190 A1 | 9/2005 | Diard et al. |

FOREIGN PATENT DOCUMENTS

| | | |
|---|---|---|
| EP | 0627700 | 12/1994 |
| JP | 2000312308 | 11/2000 |
| JP | 2001343927 | 12/2001 |

OTHER PUBLICATIONS

Colaitis, et al. "The Implementation on $P^3I$, a Parallel Architecture for Video Real-Time Processing: A Case Study", Proceedings of the IEEE. New York, US. vol. 84, No. 7, Jul. 1996.

Hermann Schomberg. "A Transputer-Based Shuffle-Shift Machine for Image Processing and Reconstruction", Proceedings of the International Conference on Pattern Recognition. Atlantic City, Jun. 16-21, 1990. Jun. 16, 1990. pp. 445-450.

Translated Chinese Office Action in Chinese Application No. 200710080282.0, dated Jan. 12, 2009.

Sommefeldt, Ryszard. "NVIDIA's SLI—An Introduction," Nov. 22, 2004, retrieved from http://www.hexus.net/content/item.php?item=916&page=1.

European Examination Report, EP App. No. 06 022 906.9-2202, Jul. 1, 2009.

Office Action. U.S. Appl. No. 11/358,611. Dated Jul. 22, 2009.

Final Office Action, U.S. Appl. No. 11/358,611 dtd. Jan. 11, 2010.

English Translation of JP 2000-312308.

English Translation of JP 2001-343927.

VIDEO PROCESSING WITH MULTIPLE GRAPHICAL PROCESSING UNITS

CROSS-REFERENCE TO RELATED APPLICATIONS

This application is a continuation of co-pending U.S. patent application Ser. No. 11/267,611, filed Nov. 4, 2005. The aforementioned related patent application is herein incorporated by reference.

BACKGROUND OF THE INVENTION

1. Field of the Invention

Embodiments of the present invention relate generally to video processing and more specifically to video processing with multiple graphics processing units.

2. Description of the Related Art

Oftentimes, video data must be processed prior to being displayed. There is a variety of video processing procedures that may be applied to video data. Consider, for example, displaying data from a digital video disc (DVD) on a progressive display. If the content on the DVD has been encoded in an interlaced format, then the video data needs to be de-interlaced before it can be displayed on the progressive display. Also, DVDs generally contain sub-title information. If a user wishes to display sub-title information, the sub-title text needs to be extracted from the video data and then composited into the video picture. De-interlacing and sub-title generation are only two examples of video processing procedures. There are many other video processing procedures that may be applied to video data, such as edge-enhancement, picture scaling, color space conversion and the like. Further, video processing procedures are generally not mutually exclusive. For example, if the user wants to display video data from a DVD on a progressive display and display sub-titles concurrently, then both the de-interlace and the sub-title generation procedures may be applied to the video data. However, since each procedure is executed on the same basic set of video data, the different video processing procedure typically are applied to the video data in series, rather than in a parallel fashion.

Video images are comprised of a sequence of video frames, where each frame is comprised of two video fields. A typical frame rate used to display video frames is thirty frames per second (30 Hz). Therefore, the video processing procedures for the video data of a frame must execute in less time than the time required to display one frame of video data (approximately 33 milliseconds). If the time required to process a frame of video data is greater than the time required to display a frame of video data, then the processed video data cannot be displayed. Instead, previous video data is often shown in place of the current video data. This phenomenon is commonly referred to as "dropping" video frames and is quite undesirable because it results in a lack of motion smoothness, which is noticeable by the human eye, leading to poor video quality.

A graphics processing unit (GPU) may be configured to provide video processing functionality within a video processing system. For example, the GPU may be configured to use a three-dimension (3D) pixel shader to provide edge enhancement of the video data. Similarly, the GPU can be configured to implement other video processing procedures. Each processing task requires a finite amount of time to complete. Since, as described above, the frame rate limits the amount of time available to process each frame and the video processing procedures are generally implemented in series, the number and complexity of the video processing procedures that may be executed on single GPU is limited. Exacerbating this problem is the fact that high definition video images require processing up to six times more pixels than standard definition images. Increasing the pixel count increases the amount of time required to perform each processing procedure, thereby further limiting the number of video processing procedures a single GPU can apply to a frame of video data without exceeding the video frame time budget and, thus, increasing the chance of dropping the video frame.

As the foregoing illustrates, what is needed in the art is a way to increase the video processing throughput of a video processing system so that more processing procedures may be implemented on video data, including high definition video data, without increasing the incidence of dropped frames.

SUMMARY OF THE INVENTION

One embodiment of the invention sets forth a system for processing video data. The system includes a host processor, a first media processing device coupled to a first frame buffer and a second media processing device coupled to a second frame buffer. The first frame buffer is configured to store video data, and the first media processing device is configured to process a first portion of that video data. The second frame buffer is configured to store a copy of the video data, and the second media processing device is configured to process a second portion of the video data. The two media processing devices are coupled together via a scalable bus. The scalable bus carries the second portion of the video data processed by the second media processing device to the first media processing device where the data is combined with the first portion of the video data processed by the first media processing device to produce a processed video frame.

One advantage of the disclosed system is that it provides a multi-media processing environment capable of processing video data more efficiently than prior art, single-GPU video processing systems. As a result, video frames may be processed in substantially less time relative to prior art systems, and the number and complexity of the video processing commands executed using the disclosed system may be substantially increased relative to prior art systems.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Among other things, the invention described herein enables two or more media processing devices to be implemented in a video processing system to process frames of video data. By using multiple media processing devices to process video frames, video processing throughput may be increased, which allows more video processing procedures, and/or more complex procedures, to be applied to the video data without increasing the incidence of dropped frames. Conversely, if the same number of video processing procedures is applied to the video data using multiple media processing devices, the incidence of dropped frames decreases.

Figure 1:
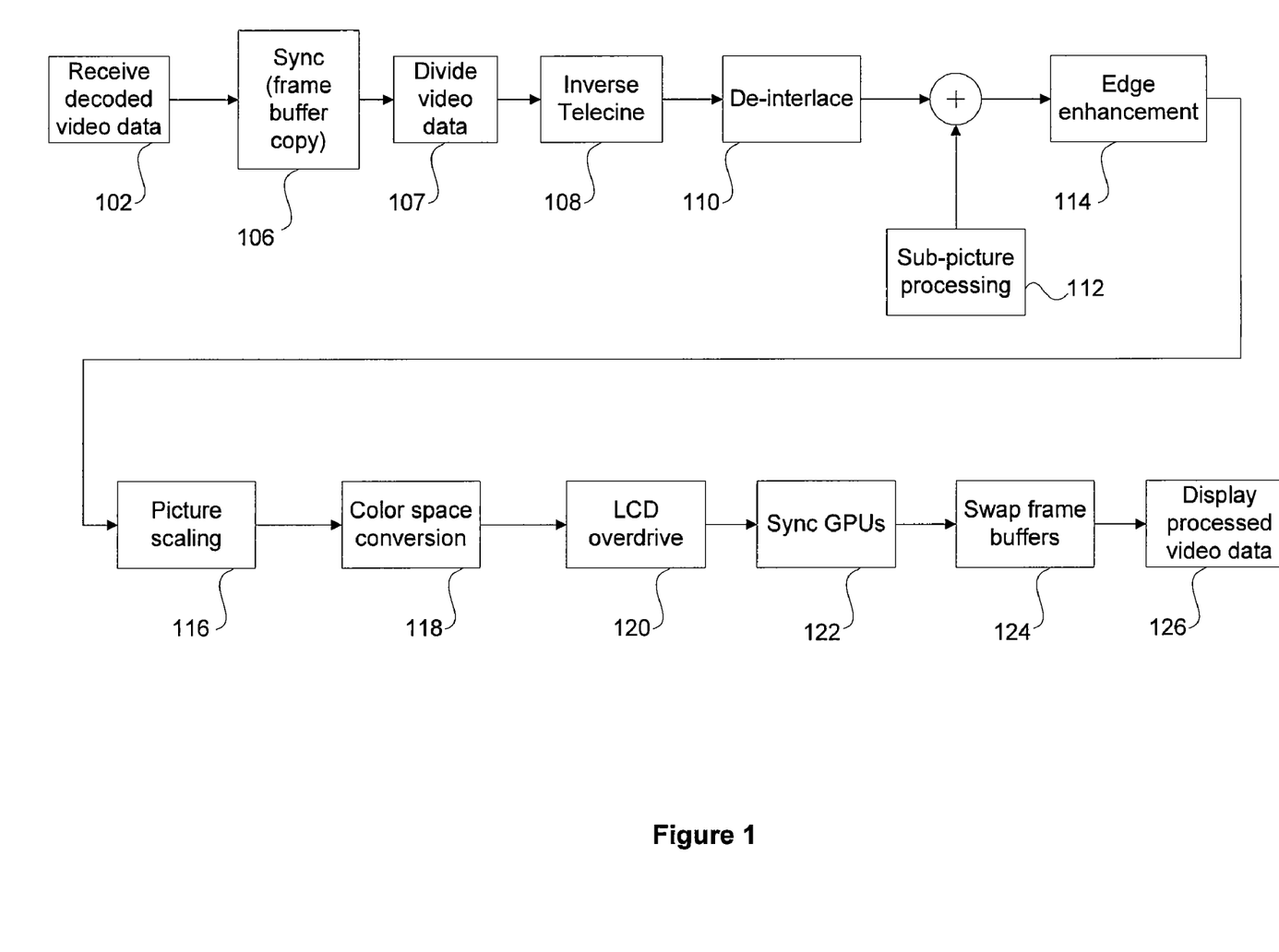
FIG. 1 is a conceptual illustration of the functional steps a video processing system implements when processing a frame of video data using multiple media processing devices, according to one embodiment of the invention.

FIG. 1 is a conceptual illustration of the functional steps a video processing system implements when processing a frame of video data using multiple media processing devices, according to one embodiment of the invention. Persons skilled in the art will recognize that any system configured to perform these functional steps in any order is within the scope of the invention. In particular, the embodiments of the video processing system disclosed herein depict graphics processing units as the media processing devices within the system. However, in alternative embodiments, any type of video or media accelerator may be implemented. For example, the video processing system described herein could be implemented with a device having one or more video processing engines that does not have any particular graphics processing capabilities.

The first functional step is step 102, where a master GPU receives decoded video data. In a multi-GPU system having two GPUs, a first GPU is designated the master GPU and a second GPU is designated the slave GPU. The video data may be received from sources such as a tuner, a decoder, a storage device or the like. Video data is typically received one frame at a time and is stored in a frame buffer associated with the master GPU. As is well-known, the frame buffer is a section of GPU memory. There are many ways that the video data may be received into the frame buffer of the master GPU such as by a direct memory access (DMA) or the by the CPU writing the video data directly into the frame buffer.

In step 106, the frame buffer of the slave GPU is synchronized with the frame buffer of the master GPU, enabling the master GPU and the slave GPU to simultaneously process the video data in their respective frame buffers. In step 107, the frame buffers of the master GPU and the slave GPU are divided into a first and second portion. Each of the GPUs is then configured to process video data residing in only a specified portion its respective frame buffer to increase operational efficiencies. For example, if the first portion is the upper part of each frame buffer and the second portion is the lower part of each frame buffer, the master GPU may be configured to process only the video data residing within the first portion of the master frame buffer, while the slave GPU may be configured to process only the video data residing within the second portion of the slave frame buffer. In step 108, the GPUs provide inverse telecine processing. Oftentimes, video data originates from film, which has a frame rate of twenty-four frames per second. If the video data is to be displayed at a frame rate of thirty frames per second, then a process commonly called "three-two pulldown" is applied to the film data so that film images from the slower frame rate may be displayed as video images at the higher frame rate. This process may add undesired visual artifacts, especially if the display device does not require the three-two pulldown process, as is the case for progressive displays. In such cases, the inverse telecine processing step returns the video data to the original film frame rate. As described in further detail herein, when the GPUs process the video data (in this step and in others), each GPU processes only a portion of the data in its frame buffer, thereby substantially increasing the processing efficiency of the video processing system.

In step 110, the GPUs provide de-interlacing processing. De-interlacing is a well-known process that transforms interlaced video data into video data more suitable for display on progressive display devices. There are many well-known methods that may be used to implement de-interlacing functionality, such as vertical interpolation (commonly called "BOB") and displaying both fields simultaneously (commonly called "WEAVE"). Persons skilled in the art will recognize that other, more advanced, de-interlacing schemes also may be implemented on the GPUs. In step 112, the GPUs provide sub-picture processing. Sub-picture processing is typically used to insert subtitles and DVD menus into the video data. Subtitle and DVD information is extracted from the video data and then composited into the visible portion of the video data. In step 114, the GPUs provide edge enhancement processing. Sometimes the video data has been processed in a manner that makes the edges of objects in the video frame appear soft. Edge enhancement processing is commonly used to augment the visual appearance of the edges. In step 116, the GPUs provide picture scaling processing. In this step, the video data may be scaled to a greater or lesser resolution. This procedure is typically performed when the resolution of the video display differs from the resolution of the source of the video data. In step 118, the GPUs provide color space conversion processing. The color space requirements of the display device may differ from the color space representation of the video data. For example, video data is often represented in the YUV color space; however, typical display devices operate in the RGB color space. In step 120, the GPUs provide LCD overdrive processing to compensate for undesirable LCD display characteristics.

Once the video data has been processed, the processed data residing in each GPU frame buffer is combined for display. In step 122, the GPUs are synchronized since the GPUs may complete the video processing at different times. As described in further detail herein, the master and slave GPUs are synchronized through a process of reading and writing semaphores. In step 124, a software driver swaps the frame buffers. Video processing is often carried out with a well-known technique called double buffering. Double buffering uses two frame buffers to store and process video data. A GPU uses a first frame buffer to process a current frame of video data, while previously processed video data is read from a second frame buffer and transmitted to a display. After the last pixel of the second frame buffer is transmitted to the display, the two frame buffers are "swapped" so that the processed data from the first frame buffer may be read and transmitted to the display device, while the GPU processes a new frame of video data in the second frame buffer. Finally, in step 126, the video data is displayed on a display.

Aspects of these functional steps are described in further detail below in conjunction with FIG. 4. Alternative embodiments may include other video processing steps, such as noise filtering, color enhancement or the like. Still other embodiments may omit some video processing steps. For example, if the video data is not displayed on an LCD display, then the LCD overdrive processing step 120 may be skipped. Persons skilled in the art also will understand that the concept of double buffering, described above in step 124, may be extended to triple buffering, where three buffers instead of two buffers are used. Triple buffering is especially useful when video decoding is performed. In such cases, one buffer is typically used for decode, one buffer is used for post-processing, and the third buffer is used for display, where all three functions run concurrently.

Figure 2:
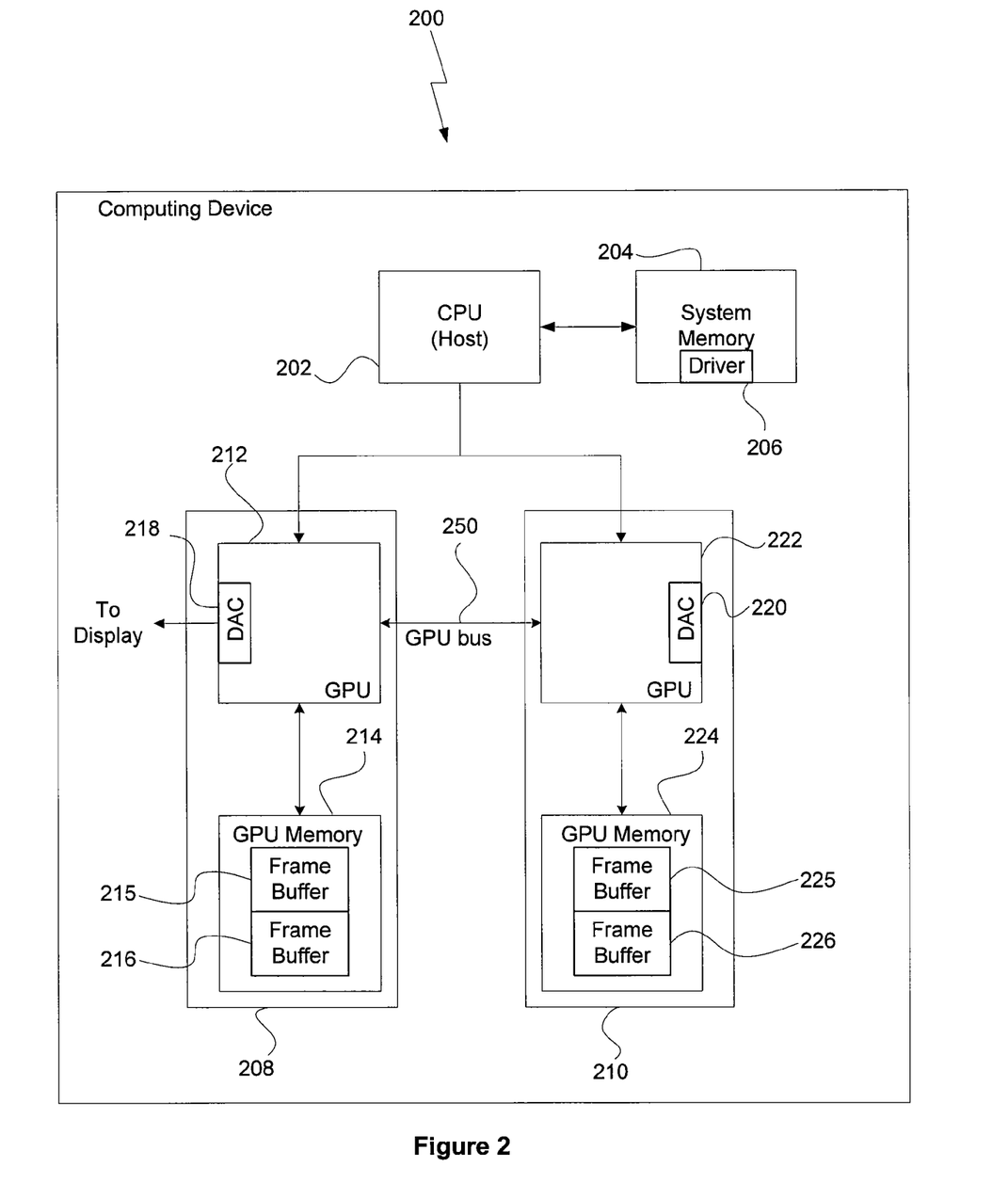
FIG. 2 is a conceptual diagram of a computing device configured to implement one or more aspects of the present invention.

FIG. 2 is a conceptual diagram of a computing device 200 configured to implement one or more aspects of the current invention. The computing device 200 includes, without limitation, a central processing unit (CPU) 202, system memory 204, a first graphics subsystem 208 and a second graphics subsystem 210. The CPU 202 is coupled to the system memory 204, which is used to store data and programs, such as a driver 206 that can configure the graphics subsystems 208 and 210 to provide the desired video processing functionality.

The first graphics subsystem 208 includes a first GPU 212 coupled to a first GPU memory 214, which is configured to store GPU instructions and data, such as video data. As described above, video data is stored in a doubled-buffered frame buffer that includes a first frame buffer 215 and a second frame buffer 216. For purposes of discussion only, it is assumed that a portion of the current video frame is being processed in the first frame buffer 215 and a portion of the video frame currently being transmitted to the display device is being read from the second frame buffer 216. The first GPU 212 also includes a digital to analog converter (DAC) 218, which is used to transmit processed video to a display. As shown, the first GPU 212 is designated as the master GPU. Typically, the master GPU 212 displays the processed video data. In alternative embodiments, video data may be transmitted via other display interfaces included in the first GPU 212, such as transition minimized differential signaling (TMDS) interface, a serial digital interface (SDI) or the like.

The second graphics subsystem 210 includes a second GPU 222 and a second GPU memory 224. In one embodiment, the second graphics subsystem 210 is substantially similar to the first graphics subsystem 208. The second GPU 222 is coupled to the second GPU memory 224, which is configured to store GPU instructions and data, such as video data. Again, video data is stored in double-buffered frame buffer that includes a third frame buffer 225 and a fourth frame buffer 226. For purposes of discussion only, it is assumed that a portion of the current video frame is being processed in the third frame buffer 225 and a portion of the video frame currently being transmitted to the display device is being read from the fourth frame buffer 226. As shown, the second GPU 222 is designated as the slave GPU. Since the slave GPU 222 is typically not used to transmit the processed video data to a display, a DAC 220 within the slave GPU 222 may be left unconnected.

The first GPU 212 is coupled to the second GPU 222 by a GPU bus 250. The GPU bus 250 is a scalable bus used by the second GPU 222 to transmit processed video data to the first GPU 212. For example, in one embodiment, the GPU bus 250 may be implemented using the NVIDIA SLI™ multi-GPU technology. Further, as previously described herein, the computing device 200 may be implemented using any type of video or media accelerator. In alternative embodiments, therefore, the GPU bus 250 may be any type technically feasible scalable bus that transmits processed video data between media processing devices.

In operation, the driver 206 generates a stream of commands called a "push buffer." When executed, the commands in the push buffer enable multi-GPU processing of video data stored in the frame buffers of the first GPU 212 and the second GPU 222. First, video data is copied from the first frame buffer 215 to the third frame buffer 225. Second, as described above, the frame buffers are split into first and second portions (which effectively divides the video data into first and second portions), and the first GPU 212 is configured to process the first portion of the video data (i.e., the video data residing in the first portion of the first frame buffer 215), and the second GPU 222 is configured to process only the second portion of the video data (i.e., the video data residing in the second portion of the third frame buffer 225). Third, the video data residing in the first portion of the first frame buffer 215 and the second portion of the third frame buffer 225 is processed. Fourth, after the video data is processed, the first GPU 212 and the second GPU 222 are synchronized, and then the first frame buffer 215 and the third frame buffer 225 are swapped with the second frame buffer 216 and the fourth frame buffer 226, respectively. Fifth, the processed video data is transmitted from the second portion of the third frame buffer 225 to the first GPU 212. This data is combined with the processed video data from the first portion of the first frame buffer 215 to produce a processed video frame that is then transmitted for display. These operations are described in greater detail below in conjunction with FIG. 4.

In alternative embodiments, more than two graphics subsystems may be used in the computing device 200. In such a configuration, there is a single master GPU and two or more slave GPUs. The slave GPUs are coupled to the master GPU via the GPU bus 250. The video data processed by the slave GPUs is transmitted to the master GPU through the GPU bus 250. The master GPU transmits the combined processed video data to the display device.

Figure 3:
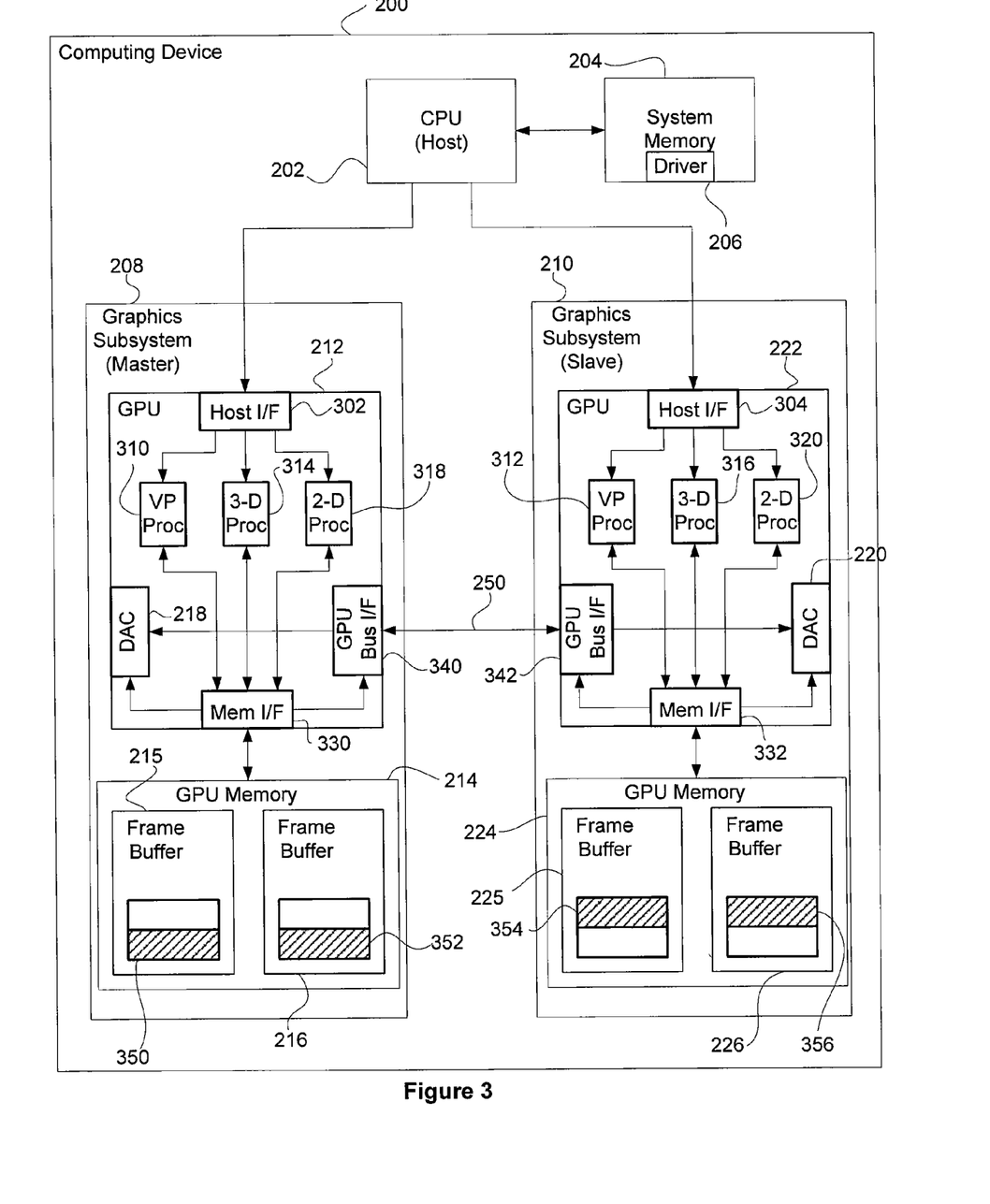
FIG. 3 is a more detailed diagram of the computing device of FIG. 2, according to one embodiment of the invention.

FIG. 3 is a more detailed diagram of the computing device 200 of FIG. 2, according to one embodiment of the invention. In particular, the master GPU 212 and the slave GPU 222 and the GPU memories 214 and 224 are described in more detail herein. As shown, the master GPU 212 includes, without limitation, a video processor 310, a three-dimensional (3-D) processor 314, a two-dimensional (2-D) processor 318, a host interface 302, a memory interface 330 and a GPU bus interface 340. The host interface 302 is coupled to the video processor 310, the 3-D processor 314 and the 2-D processor 318. The host interface 302 receives the push buffer commands from the CPU 202 (and the driver 206) and configures the video processor 310, the 3-D processor 314 and the 2-D processor 318 to process video data according to the push buffer commands. The video processor 310, the 3-D processor 314 and the 2-D processor 318 are further coupled to the memory interface 330. The memory interface 330 enables the video processor 310, the 3-D processor 314 and the 2-D processor 318 to access video data stored in the GPU memory 214.

Similarly, the slave GPU 220 includes, without limitation, a video processor 312, a 3-D processor 316, a 2-D processor 320, a host interface 304, a memory interface 332 and a GPU bus interface 342. Again, the host interface 304 is coupled to the video processor 312, the 3-D processor 316 and the 2-D processor 320. The host interface 304 receives the push buffer commands from the CPU 202 (and the driver 206) and configures the video processor 312, the 3-D processor 316 and the 2-D processor 320 to process video data according to the push buffer commands. The video processor 312, the 3-D processor 316 and the 2-D processor 320 are further coupled to the memory interface 332. The memory interface 332 enables the video processor 312, the 3-D processor 316 and the 2-D processor 320 to access video data stored in the GPU memory 224.

There are many well-known ways in which video processing functionality may be provided by processing units within the master GPU 212 and the slave GPU 220. For example, the video processors 310 and 312 may be configured to provide video processing functionality such as picture scaling. The 3-D processors 314 and 316 may be configured to uses the included pixel shaders to provide video processing functionality such as edge enhancement. The 2-D processors 318 and 320 may be configured to provide video processing functionality such as a memory blit to copy the video data from the master GPU memory 214 to the slave GPU memory 224. A memory blit is a common 2-D process that copies the contents of a block of memory from one location to another.

As also shown, the GPU memory 214 includes a first frame buffer 215 and a second frame buffer 216, and the GPU memory 224 includes a third frame buffer 225 and a fourth frame buffer 226. Again, for purposes of discussion only, it is assumed that the master GPU 212 and 220 are processing the video data residing in the first and third frame buffers 215, 225, while the previously processed video data resides in the second and fourth frame buffers 216, 226. Since, as described earlier in FIG. 1, decoded video is written into the first frame buffer 215 of the master GPU 212, the driver 206 configures the master GPU 212 to copy the contents of the first frame buffer 215 to the third frame buffer 225. The driver 206 also provides commands to synchronize the master GPU 212 and the slave GPU 222 so that the video data in the first frame buffer 215 and the third frame buffer 225 may be simultaneously processed. After the video data is copied and the GPUs are synchronized, the driver 206 divides the video data in the frame buffers 215 and 225 each into a first portion and a second portion. Each of the master GPU 212 and the slave GPU 222 processes a portion of the video data in its respective frame buffer. For example, driver 206 may configure the master GPU 212 to process the video data residing in a first portion 350 of the first frame buffer 215. Similarly, the driver 206 may configure the slave GPU 220 to process the video data residing in a second portion 354 of the third frame buffer 225. After the current video frame is processed, the first frame buffer 215 is swapped with the second frame buffer 216, and the third frame buffer 225 is swapped with the fourth frame buffer 226. Thus, when processing the next video frame, the master GPU 212 processes the video data residing in a first portion 352 of the second frame buffer 216, and the slave GPU 222 processes the video data residing in a second portion 356 of the fourth frame buffer 226. Processing efficiency is increased since each GPU is processes only a portion of the video data comprising the video frame.

After the master GPU 212 and the slave GPU 222 complete the video processing procedures on the video data, but before the frame buffers are swapped, the driver 206 synchronizes the master GPU 212 and the slave GPU 222. By synchronizing the GPUs 212 and 222, the driver 206 ensures that both the master GPU 212 and the slave GPU 222 have completed processing their respective video data before swapping the frame buffers. This synchronization step is important because, among other things, if one of the GPUs has not yet completed processing its portion of the video data when the system attempts to swap the frame buffers and combine the video data, then the video frame being processed may be dropped.

The GPU bus interfaces 340 and 342 enable two or more GPUs to be coupled together through the GPU bus 250. Again, as described herein, in alternative embodiments, the GPU bus 250 may be any type of technically feasible scalable bus used to transmit processed video data between whatever types of media processing devices are implemented in the computing device 200. Thus, alternative embodiments of GPU bus interfaces 340 and 342, may be any technically feasible interfaces to the scalable bus used to transmit processed video data between media processing devices. The GPU bus interface 342 of the slave GPU 222 is coupled to the memory interface 332 and the DAC 220. The GPU bus interface 340 of the master GPU 212 is also coupled to the memory interface 332 and the DAC 218. The driver 206 configures the GPU bus interface 342 of the slave GPU 220 to transmit the processed video data from the relevant portions (e.g., the second portion 354 and the second portion 356) of the third and fourth frame buffers 225 and 226 to the master GPU 212. Likewise, the driver 206 configures the GPU bus interface 340 of the master GPU 212 to receive the processed video data from the slave GPU 220 and to transmit that processed video data to the DAC 218.

The DAC 218 of the master GPU 212 is coupled to memory interface 330 as well as to a display device (not shown) or a memory element (not shown) where processed video frames are stored until they are displayed. The DAC 220 of the slave GPU is similarly coupled to memory interface 332, but, typically, the DAC 220 of the slave GPU 222 is not connected to any display or related memory element. The DAC 218 of the master GPU 212 is configured to combine the processed video data within the relevant portions (e.g., the first portion 350 and the first portion 352) of the first and second frame buffers 215 and 216, respectively, with the processed video data received by the GPU bus interface 340 from the slave GPU 222 to create a processed video frame. The DAC 218 is further configured to transmit the processed video frame to the display device or related memory element, as the case may be.

Figure 4:
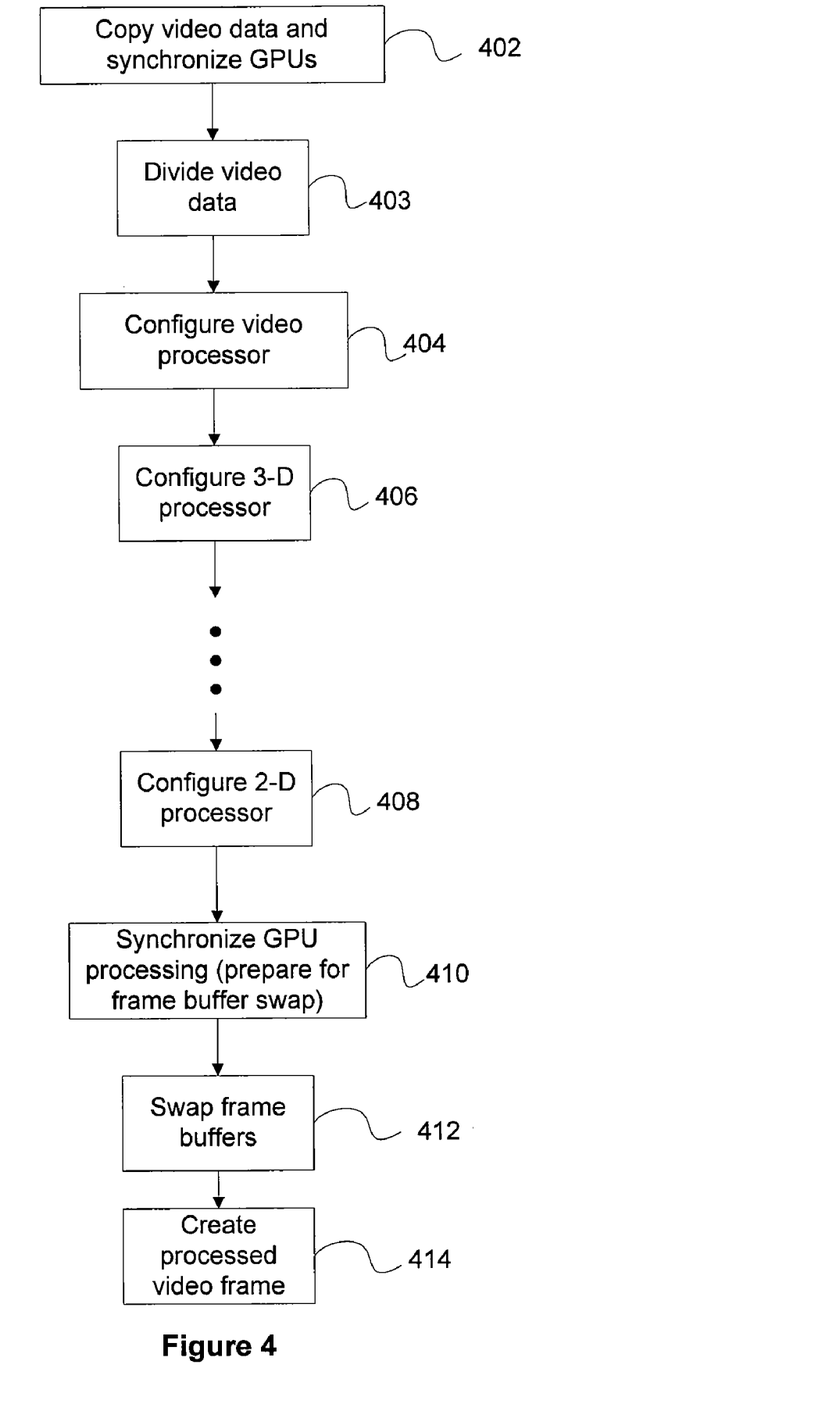
FIG. 4 is a flow diagram of method steps implemented by the computing device of FIGS. 2 and 3 when processing a frame of video data, according to one embodiment of the invention.

FIG. 4 is a flow diagram of method steps implemented by the computing device of FIGS. 2 and 3 when processing a frame of video data, according to one embodiment of the invention. Persons skilled in the art will recognize that any system configured to perform the method steps in any order is within the scope of the invention. Further, the method described herein may be repeated for each frame of video data to be processed.

The method begins in step 402, where the driver 206 configures the master GPU 212 to copy the video data from the first frame buffer 215 of the master GPU 212 to the third frame buffer 225 of the slave GPU 222. For the purposes of discussion only, it is assumed that the master GPU 212 and the slave GPU 222 are processing the current video frame in the first and third frame buffers 215 and 225, respectively, and that the previously processed video frame is being transmitted from the second and fourth frame buffers 216 and 226 for display. The master GPU 212 and the slave GPU 222 are then synchronized by series of semaphore commands in the push buffer. The semaphore commands prevent the slave GPU 222 from executing subsequent push buffer commands while the master GPU 212 copies the video data from the first frame buffer 215 to the third frame buffer 225. Effectively, the slave GPU 222 is forced to "wait" for the master GPU 212 to finish copying the video data. Once the video data has been copied, both the master GPU 212 and the slave GPU 222 are able to resume executing commands in the push buffer and, thus, are synchronized. This copy and synchronization step is described in greater detail below in conjunction with FIG. 5A.

In step 403, the driver 206 configures the master GPU 212 and the slave GPU 222 to divide the video data residing in the first frame buffer 215 and the third frame buffer 225 into first and second portions. The master GPU 212 and the slave GPU 222 are then configured to process different portions of the video data. For example, the master GPU 212 may be configured to process the video data residing in the first portion 350 of the first frame buffer 215, and the slave GPU 222 may be configured to process the video data residing in the second portion 354 of the third frame buffer 225. As a result, the master GPU 212 and slave GPU 222 share the processing of the current video frame, thereby increasing the processing efficiency of the computing device 200. The step of dividing the video data into different portions is described in greater detail below in conjunction with FIG. 5B.

In step 404, the driver 206 configures the video processors 310 and 312. Such a configuration may, for example, configure the video processors 310 and 312 to scale the video data. In step 406, the driver 206 configures the 3-D processors 314 and 316. Such a configuration may, for example, configure the 3-D processors 314 and 316 to provide de-interlacing functionality, edge enhancement or other video processing functionality. In step 408, the driver 206 configures the 2-D processors 318 and 320. Such a configuration may, for example, configure the 2-D processors 318 and 320 to insert sub-title information or provide menus screens typical in DVD applications. In other embodiments, the master GPU 212 and the slave GPU 222 may be configured to provide a greater or lesser amount of video processing than is described in steps 404, 406 and 408 or different types of video processing.

In step 410, the driver 206 synchronizes the master GPU 212 and the slave GPU 222. Since each GPU may process video data at different rates, this step ensures that both GPUs have finished processing the video data in the frame buffers 215 and 225 before the frame buffers are swapped and the processed video data is combined to produce the processed video frame. Again, as described in greater detail below in conjunction with FIG. 5C, a series of semaphore commands in the push buffer are used to synchronize the master GPU 212 and the slave GPU 222.

In step 412, the driver 206 swaps the frame buffers. Continuing the example set forth in step 402, after the final pixel from each of the first portion 352 of the second frame buffer 216 and the second portion 356 of the fourth frame buffer 226 is displayed, the driver 206 swaps the first frame buffer 215 and the second frame buffer 216 as well as the third frame buffer 225 and fourth frame buffer 226 so that the processed video data in the first portion 350 of the first frame buffer 215 and the second portion 354 of the third frame buffer 225 may be transmitted to the DAC 218 for display. The next frame of video data to be processed is then stored in the second frame buffer 216 and the fourth frame buffer 226.

In step 414, the processed video data is combined into a processed video frame and transmitted to a display device (or related memory element) by the DAC 218. Again, continuing the example, the processed video data from the first portion 350 of the first frame buffer 215 and from the second portion 354 of the third frame buffer 225 is combined by the DAC 218 to produce the processed video frame.

Figure 5A:
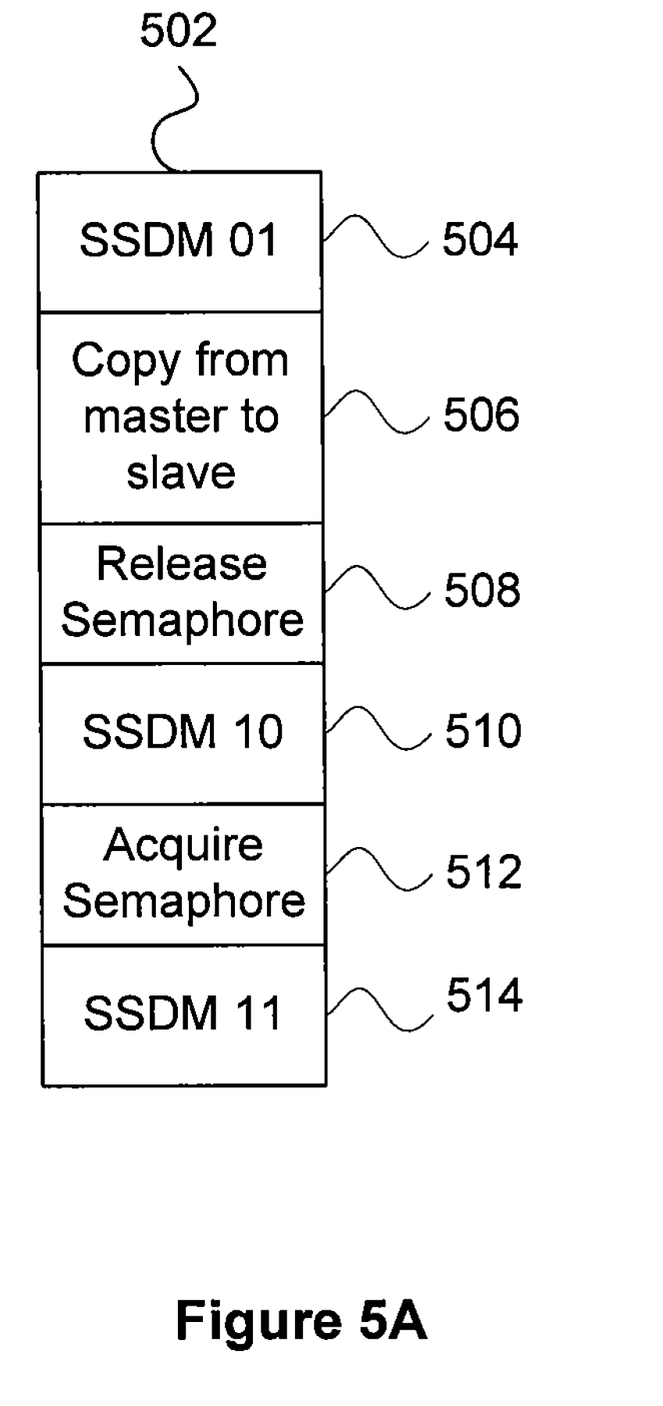
FIG. 5A is a conceptual diagram illustrating a sequence of commands used to implement step 402 of FIG. 4, according to one embodiment of the invention.

FIG. 5A is a conceptual diagram illustrating a sequence of commands 502 used to implement step 402 of FIG. 4, according to one embodiment of the invention. As shown, the commands 502 form a portion of a push buffer that is assembled by the driver 206 to configure the master GPU 212 and the slave GPU 222 to process video data. Specifically, the commands 502 cause the master GPU 212 to copy video data residing in the first frame buffer 215 to the third frame buffer 225 and also cause the synchronization of the master GPU 212 and the slave GPU 222 to enable the master GPU 212 and the slave GPU 222 to simultaneously process portions of the video data residing in the first frame buffer 215 and the third frame buffer 225.

A set sub-device mask (SSDM) command 504 sets a sub-device mask to 01, enabling only the master GPU 212 to execute subsequent commands in the push buffer. The argument to the SSDM command determines which GPU is configured to execute subsequent commands in the push buffer. In one embodiment, the argument is a two-bit bit field, where each bit within the bit field corresponds to one of the two GPUs. If, for example, the first bit corresponds to the master GPU 212 and the second bit corresponds to the slave GPU 222, then an SSDM 01 command would configure the master GPU 212 to execute subsequent commands in the push buffer commands, while the slave GPU 222 ignores the subsequent commands. An SSDM 11 command would configure both the master GPU 212 and the slave GPU 222 to execute subsequent commands in the push buffer. The next command is a copy command 506, which directs the master GPU 212 to copy the contents of the first frame buffer 215 to the third frame buffer 225. The execution of this command provides the master GPU 212 and the slave GPU 222 access to the same video data.

A release semaphore command 508 causes the master GPU 212 to release a semaphore. The driver uses semaphores to synchronize the master GPU 212 and the slave GPU 222 to enable the GPUs to simultaneously process portions of the video data in the first frame buffer 215 and the third frame buffer 225. A semaphore is a pointer to a specific address in system memory. A semaphore may be released or acquired. When a GPU executes a release semaphore command, the GPU writes a specific value to the memory location associated with the semaphore. When a GPU executes an acquire semaphore command, the GPU reads the memory location associated with the semaphore and compares the value of that memory location with the value reflected in the acquire semaphore command. The two values not matching indicates that the semaphore associated with the acquire semaphore command has not yet been released. If there is no match, the GPU executing the acquire semaphore command continues reading the memory location associated with the semaphore until a match is found. Consequently, the GPU executing the acquire semaphore command does not execute any additional push buffer commands until a match is found. For example, assume that a first GPU is directed to release a semaphore having a value of 42 and then a second GPU is directed to acquire the semaphore having a value of 42. The second GPU will continue reading the system memory location associated with the semaphore until that memory location has a value of 42. Importantly, the second GPU will not execute the next push buffer command until the memory location has value of 42, and the memory will have a value of 42 only when the first GPU releases the semaphore having a value of 42.

An SSDM command 510 sets the sub-device mask to 10, enabling only the slave GPU 222 to execute subsequent commands in the push buffer. An acquire semaphore command 512 directs the slave GPU 222 to acquire the semaphore released by the master GPU 212 in response to the release semaphore command 508. As described above, since the slave GPU 222 will not execute any additional push buffer commands until the master GPU 212 releases the semaphore, and the master GPU 212 does not release the semaphore until the copy command 506 has been fully executed, the slave GPU 222 is forced to "wait" for the master GPU 212 to copy the video data from the first frame buffer 215 to the third frame buffer 225 before executing any additional push buffer commands. Thus, the master GPU 212 and the slave GPU 222 are "synchronized" once the semaphore is released by the master GPU 212 and acquired by the slave GPU 222. An SSDM command 514 sets the sub-device mask to 11, enabling both GPUs to execute the next command in the push buffer.

Figure 5B:
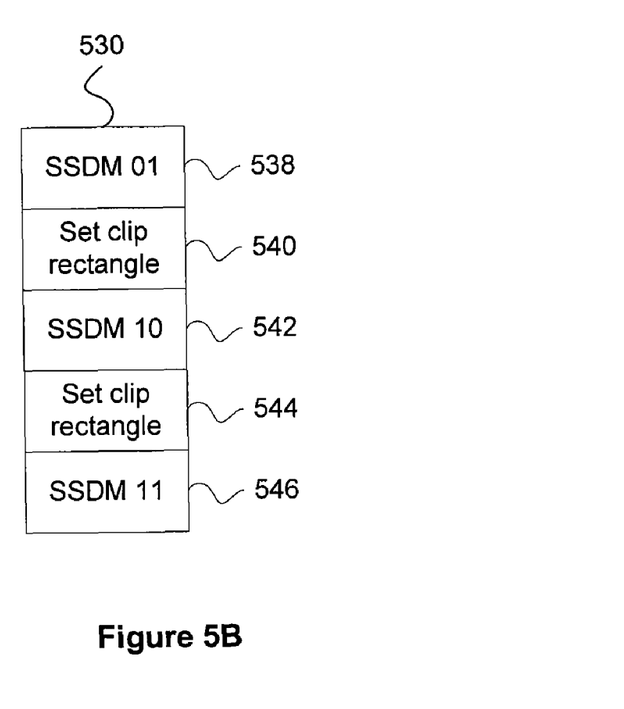
FIG. 5B is a conceptual diagram illustrating a sequence of commands used to implement step 403 of FIG. 4, according to one embodiment of the invention.

FIG. 5B is a conceptual diagram illustrating a sequence of commands 530 used to implement step 403 of FIG. 4, according to one embodiment of the invention. As shown, the commands 530 form a portion of the push buffer that is assembled by the driver 206 to configure the master GPU 212 and the slave GPU 222 to process video data. Specifically, the commands 530 divide the video data into a first portion and a second portion. The master GPU 212 processes the first portion of the video data, and the slave GPU 222 processes the second portion of the video data. Thus, the master GPU 212 and the slave GPU 222 are able to simultaneously process the video data, leading to enhanced processing efficiencies relative to prior art systems.

An SSDM command 538 sets the sub-device mask to 01, enabling only the master GPU 212 to execute subsequent commands in the push buffer. A set clip rectangle command 540 sets the clip rectangle for the master GPU 212. The driver 206 uses set clip rectangle commands to define the portion of the video data that each GPU processes. In one embodiment, the set clip rectangle command defines the boundaries of the portion of video data that a particular GPU processes by specifying four corners of the frame buffer coupled to that GPU. The GPU is then configured to process video data that resides within those four corners of the frame buffer. For example, if the driver 206 divided a frame buffer approximately in half, the upper portion of the frame buffer could be specified by the set clip rectangle command with corner pixel coordinates (0,0), (w,0), (h/2, 0) and (h/2,w), where h is the height of the frame buffer and w is the width of the frame buffer. The lower portion of the frame buffer could be specified by the set clip rectangle command with corner pixel coordinates (h/2, 0), (h/2,w), (h,0) and (h,w). Thus, the clip rectangle command 540 specifies four corners of the frame buffer 215. The video data within these four corners constitutes the portion of the video data processed by the master GPU 212.

Since a larger clip rectangle includes relatively more video data than a small clip rectangle, the driver 206 may control the amount of processing performed by each GPU by controlling the amount of video data in the specified clip rectangles. In alternative embodiments, the portion of the video data that a given GPU processes may be specified by pixel location within the frame, by line number or by any other technically feasible means.

An SSDM command 542 sets the sub-device mask to 10, enabling only the slave GPU 222 to execute subsequent commands in the push buffer. A set clip rectangle command 544 sets the clip rectangle for the slave GPU 222 by specifying four corners of the frame buffer 225. The video data within these four corners constitutes the portion of the video data processed by the slave GPU 222. An SSDM command 546 sets the sub-device mask to 11, enabling both the master GPU 212 and the slave GPU 222 to execute subsequent commands in the push buffer. As previously described herein, if the next command in the push buffer is a video processing command, the master GPU 212 executes that command on the portion of the video data in the first frame buffer 215 within the clip rectangle specified in the set clip rectangle command 540. Likewise, the slave GPU 222 executes that command on the portion of the video data in the third frame buffer 225 within the clip rectangle specified in the set clip rectangle command 544.

Figure 5C:
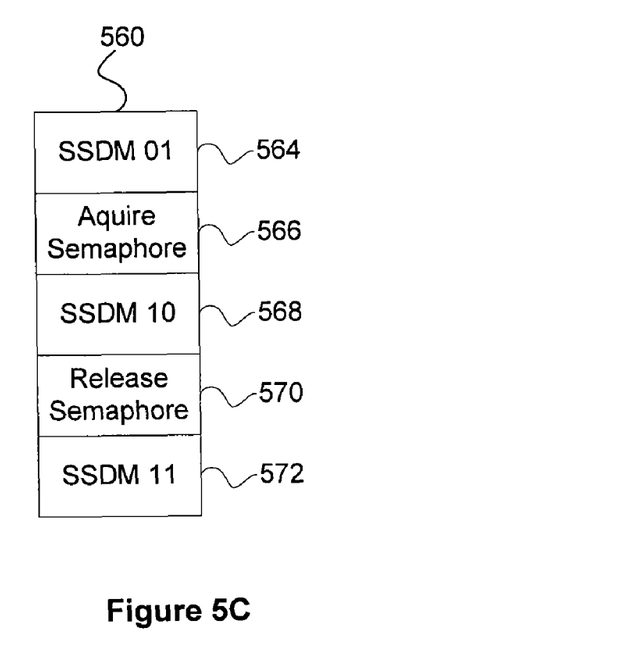
FIG. 5C is a conceptual diagram illustrating a sequence of commands used to implement step 410 of FIG. 4, according to one embodiment of the invention.

FIG. 5C is a conceptual diagram illustrating a sequence of commands 560 used to implement step 410 of FIG. 4, according to one embodiment of the invention. As shown, the commands 560 form a portion of the push buffer that is assembled by the driver 206 to configure the master GPU 212 and the slave GPU 222 to process video data. Specifically, the commands 560 synchronize the master GPU 212 and the slave GPU 222 after the video data in the first frame buffer 215 and the third frame buffer 225 has been processed. As described above in FIG. 5B, in a multi-GPU system, the master GPU 212 and the slave GPU 222 process different portions of the video data. As a consequence, the master GPU 212 and the slave GPU 222 may finish processing their respective portions of the video data at slightly different times. Synchronizing the master GPU 212 and the slave GPU 222 ensures that each GPU has completed processing the video data in the first frame buffer 215 and the third frame buffer 225, respectively, before the video data processed by the slave GPU 222 is transmitted to the master GPU 212 and combined with the video data processed by the master GPU 212 to produce the processed video frame. This synchronization step is important because, among other things, if one of the GPUs has not yet completed processing its portion of the video data when the system attempts to combine the video data, then that video frame may be dropped.

An SSDM command 564 sets the sub-device mask to 01, enabling only the master GPU 212 to respond to subsequent commands in the push buffer. An acquire semaphore command 566 directs the master GPU to acquire a semaphore. An SSDM command 568 sets the sub-device mask to 10, enabling only the slave GPU 222 to execute subsequent commands in the push buffer. A release semaphore command 570 directs the slave GPU 222 to release the semaphore specified in the acquire semaphore command 566. As previously described herein, since the master GPU 212 does not execute any additional push buffer commands until the slave GPU 222 releases the semaphore, the GPUs are synchronized once the slave GPU 222 releases the semaphore and the master GPU 212 acquires the semaphore because, at this point, both GPUs are able to execute the next command in the push buffer. An SSDM command 572 sets the sub-device mask to 11, enabling both GPUs to execute subsequent command in the push buffer.

Persons skilled in the art will recognize that the above commands may be used to configure the master GPU 212 and the slave GPU 222 such that only one of the GPUs executes certain processing commands on its respective portion of the video data. For example, if subtitles need to be added to the bottom of a video frame, SSDM commands may be used to enable one GPU, while disabling the other. The enabled GPU would be the GPU responsible for processing the bottom portion of the video data. That GPU would then execute the processing commands required to add the desired subtitles. Since the other GPU would be disabled, no processing would be performed on the upper portion of the video data while the subtitles are added.

One advantage of the disclosed systems and methods is that they provide a multi-GPU video processing system that processes video data more efficiently than prior art, single-GPU systems. As a result, video frames may be processed in substantially less time relative to prior art systems, and the number and complexity of the video processing commands executed using the disclosed system may be substantially increased relative to prior art systems.

While the foregoing is directed to embodiments of the present invention, other and further embodiments of the invention may be devised without departing from the basic scope thereof, and the scope thereof is determined by the claims that follow.

We claim:

1. A memory storing a driver software application including instructions that, when executed by a processor, cause the processor to generate a push buffer including a set of commands, the set of commands comprising:

a first set sub-device mask (SSDM) command that configures a first processing device and a second processing device such that only the first processing device executes commands in the push buffer subsequent to the first SSDM command by acquiring a first semaphore;

a copy command that causes the first processing device to copy video data stored in a first frame buffer coupled to the first processing device to a second frame buffer coupled to the second processing device;

a second SSDM command that configures the first processing device and the second processing device such that only the second processing device executes commands in the push buffer subsequent to the second SSDM command; and a third SSDM command that configures the first processing device to process a first portion of the video data and the second processing device to process a second portion of the video data by executing commands in the push buffer subsequent to the third SSDM command, wherein the second processing device is configured to transmit the processed second portion of the video data to the first processing device.

2. The memory of claim 1, wherein the set of commands further comprises a release semaphore command that causes the first processing device to release a first semaphore.

3. The memory of claim 2, wherein the set of commands further comprises an acquire semaphore command that causes the second processing device to acquire the first semaphore released by the first processing device.

4. The memory of claim 3, wherein the first processing device and the second processing device are synchronized after the second processing device acquires the first semaphore.

5. The memory of claim 1, wherein the set of commands further comprises a divide command that causes the first processing device to define the first portion of the video data and the second portion of the video data.

6. The memory of claim 5, wherein the divide command is a set clip rectangle command.

7. The memory of claim 1, wherein the processed second portion of the video data is transmitted to the first processing device via a scalable bus and is combined with the processed first portion of the video data to generate a processed video frame.

8. The memory of claim 1, wherein each of the first frame buffer and the second frame buffer is swapped with another frame buffer before the second processing device transmits the processed second portion of the video data to the first processing device.

9. The memory of claim 1, wherein each of the first processing device and the second processing device is a different graphics processing unit.

10. A system for processing video data, the system comprising:

a host processor;

a system memory including a driver;

a first processing device coupled to a first frame buffer, wherein the first frame buffer is configured to store video data, and the first processing device is configured to process a first portion of the video data; and a second processing device coupled to a second frame buffer, wherein the second frame buffer is configured to store a copy of the video data, and the second processing device is configured to process a second portion of the video data, wherein the driver is configured to generate a push buffer including a set of commands for processing the video data that includes:

a first set sub-device mask (SSDM) command that configures the first processing device and the second processing device such that only the first processing device executes commands in the push buffer subsequent to the first SSDM command by acquiring a first semaphore, a copy command that causes the first processing device to copy the video data stored in the first frame buffer to the second frame buffer, a second SSDM command that configures the first processing device and the second processing device such that only the second processing device executes commands in the push buffer subsequent to the second SSDM command, and a third SSDM command that configures the first processing device to process the first portion of the video data and the second processing device to process the second portion of the video data by executing commands in the push buffer subsequent to the third SSDM command, and wherein the second processing device is configured to transmit the processed second portion of the video data to the first processing device.

11. The system of claim 10, wherein the set of commands further includes a release semaphore command that causes the first processing device to release a first semaphore.

12. The system of claim 11, wherein the set of commands further includes an acquire semaphore command that causes the second processing device to acquire the first semaphore released by the first processing device.

13. The system of claim 12, wherein the first processing device and the second processing device are synchronized after the second processing device acquires the first semaphore.

14. The system of claim 10, wherein the set of commands further includes a divide command that causes the first processing device to define the first portion of the video data and the second portion of the video data.

15. The system of claim 10, wherein the processed second portion of the video data is transmitted to the first processing device via a scalable bus and is combined with the processed first portion of the video data to generate a processed video frame.

16. The system of claim 10, wherein each of the first frame buffer and the second frame buffer is swapped with another frame buffer before the second processing device transmits the processed second portion of the video data to the first processing device.

17. The system of claim 10, wherein each of the first processing device and the second processing device is a different graphics processing unit.

* * * * *